(12) United States Patent
Ando

(10) Patent No.: US 11,038,443 B2
(45) Date of Patent: Jun. 15, 2021

(54) MOTOR CONTROL SYSTEM AND MOTOR CONTROL APPARATUS

(71) Applicant: KABUSHIKI KAISHA YASKAWA DENKI, Kitakyushu (JP)

(72) Inventor: Kunimasa Ando, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 0 days.

(21) Appl. No.: 16/571,231

(22) Filed: Sep. 16, 2019

(65) Prior Publication Data
US 2020/0259432 A1  Aug. 13, 2020

(30) Foreign Application Priority Data
Feb. 12, 2019 (JP) .............................. JP2019-022988

(51) Int. Cl.
*H02P 5/747* (2006.01)

(52) U.S. Cl.
CPC .................................. *H02P 5/747* (2013.01)

(58) Field of Classification Search
CPC .......... H02P 29/0241; H02P 3/18; H02P 5/74; H02P 5/747
See application file for complete search history.

(56) References Cited

U.S. PATENT DOCUMENTS 5,210,476 A * 5/1993 Kazato ............... G05B 19/4062
                                                    318/560
5,214,362 A * 5/1993 Torii .................. G05B 19/4061
                                                    318/567

(Continued)

FOREIGN PATENT DOCUMENTS

EP        3 220 538 A2    9/2017
JP      2009-208158 A     9/2009

(Continued)

OTHER PUBLICATIONS

Extended European Search Report dated Apr. 3, 2020, in Patent Application No. 19198657.9, 18 pages.

(Continued)

*Primary Examiner* — Thai T Dinh
(74) *Attorney, Agent, or Firm* — Oblon, McClelland, Maier & Neustadt, L.L.P.

(57) ABSTRACT

A motor control system includes a motor, and a motor control apparatus including first processing circuitry that, based on a driving state quantity of the motor, controls driving power supplied to the motor, safety request input receiving circuitry through which a safety request signal is input from outside the motor control apparatus, safety cooperation input receiving circuitry through which a safety cooperation signal is input from outside the motor control apparatus, safety cooperation output circuitry through which the motor control apparatus outputs the safety cooperation signal to outside the motor control apparatus, and second processing circuitry that, upon input of at least one signal among the safety request signal and the safety cooperation signal, monitors a relationship between a predetermined motion monitor pattern and the driving state quantity and outputs the safety cooperation signal.

20 Claims, 10 Drawing Sheets

(56) References Cited

U.S. PATENT DOCUMENTS

| | | | |
|---|---|---|---|
| 8,659,254 B2* | 2/2014 | Ueno | G05B 19/18 |
| | | | 318/565 |
| 2011/0241447 A1* | 10/2011 | Ando | G05B 19/4063 |
| | | | 307/326 |
| 2016/0344266 A1* | 11/2016 | Ogawa | H04L 67/12 |
| 2016/0344429 A1 | 11/2016 | Ogawa et al. | |
| 2017/0272025 A1* | 9/2017 | Jimbo | H02P 27/08 |
| 2018/0109207 A1 | 4/2018 | Oka et al. | |
| 2018/0294762 A1* | 10/2018 | Matsumura | G05B 9/02 |

FOREIGN PATENT DOCUMENTS

| | | | |
|---|---|---|---|
| JP | 2009208158 A | * | 9/2009 |
| JP | 2016-218867 A | | 12/2016 |
| JP | 2018-68094 A | | 4/2018 |
| JP | 6369590 B1 | | 7/2018 |
| JP | 2018-182876 A | | 11/2018 |

OTHER PUBLICATIONS

Office Action dated Sep. 26, 2019 in corresponding Japanese Patent Application No. 2019-022988 (with English Translation), 11 pages.
Office Action dated Apr. 20, 2021 in Europe Patent Application No. 19 198 607.9-1202; 7 pgs.

* cited by examiner

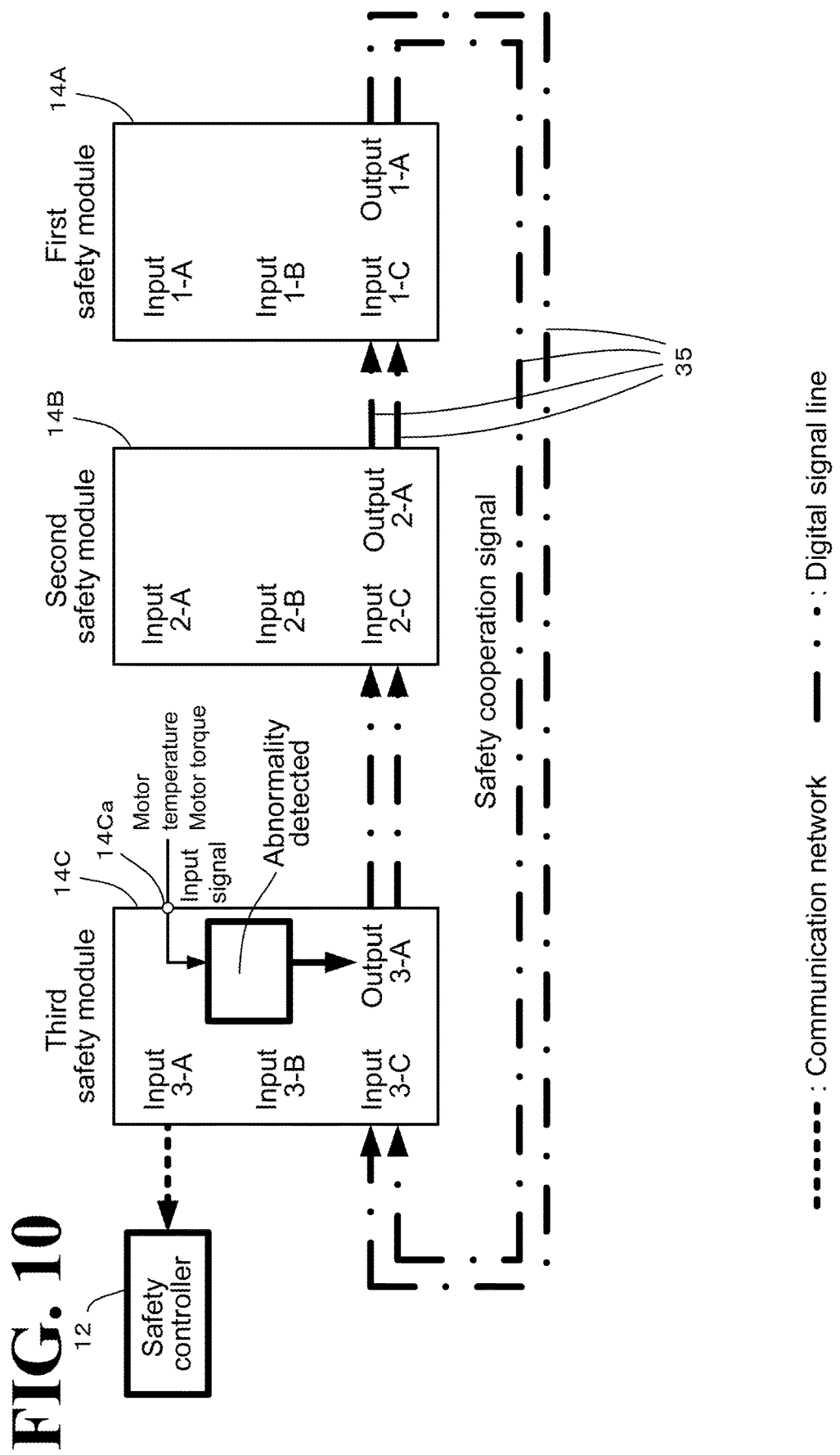

MOTOR CONTROL SYSTEM AND MOTOR CONTROL APPARATUS

CROSS-REFERENCE TO RELATED APPLICATIONS

The present application claims priority under 35 U.S.C. § 119 to Japanese Patent Application No. 2019-022988, filed Feb. 12, 2019. The contents of this application are incorporated herein by reference in their entirety.

BACKGROUND

Field of the Invention

The embodiments disclosed herein relate to a motor control system and a motor control apparatus.

Discussion of the Background

JP 6369590B discloses a motor control system that includes a motor control apparatus. The motor control apparatus compares a motion monitor pattern with a motor's driving state quantity that has been detected. When the motion monitor pattern and the driving state quantity are in a particular relationship, the motor control apparatus breaks supply of power to the motor.

SUMMARY

According to one aspect of the present invention, a motor control system includes a motor, and a motor control apparatus including first processing circuitry that, based on a driving state quantity of the motor, controls driving power supplied to the motor, safety request input receiving circuitry through which a safety request signal is input from outside the motor control apparatus, safety cooperation input receiving circuitry through which a safety cooperation signal is input from outside the motor control apparatus, safety cooperation output circuitry through which the motor control apparatus outputs the safety cooperation signal to outside the motor control apparatus, and second processing circuitry that, upon input of at least one signal among the safety request signal and the safety cooperation signal, monitors a relationship between a predetermined motion monitor pattern and the driving state quantity and outputs the safety cooperation signal.

According to another aspect of the present invention, a motor control apparatus that controls driving power supplied to a motor includes safety request input receiving circuitry through which a safety request signal is input from outside the motor control apparatus, safety cooperation input receiving circuitry through which a safety cooperation signal is input from outside the motor control apparatus, safety cooperation output circuitry through which the motor control apparatus outputs the safety cooperation signal to outside the motor control apparatus, and safety control processing circuitry that, upon input of at least one signal among the safety request signal and the safety cooperation signal, monitors a relationship between a predetermined motion monitor pattern and a driving state quantity of the motor, and outputs the safety cooperation signal.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 10 illustrates an example wiring configuration in which a signal output from a motor sensor is input into the safety module.

DESCRIPTION OF THE EMBODIMENTS

Figure 1:
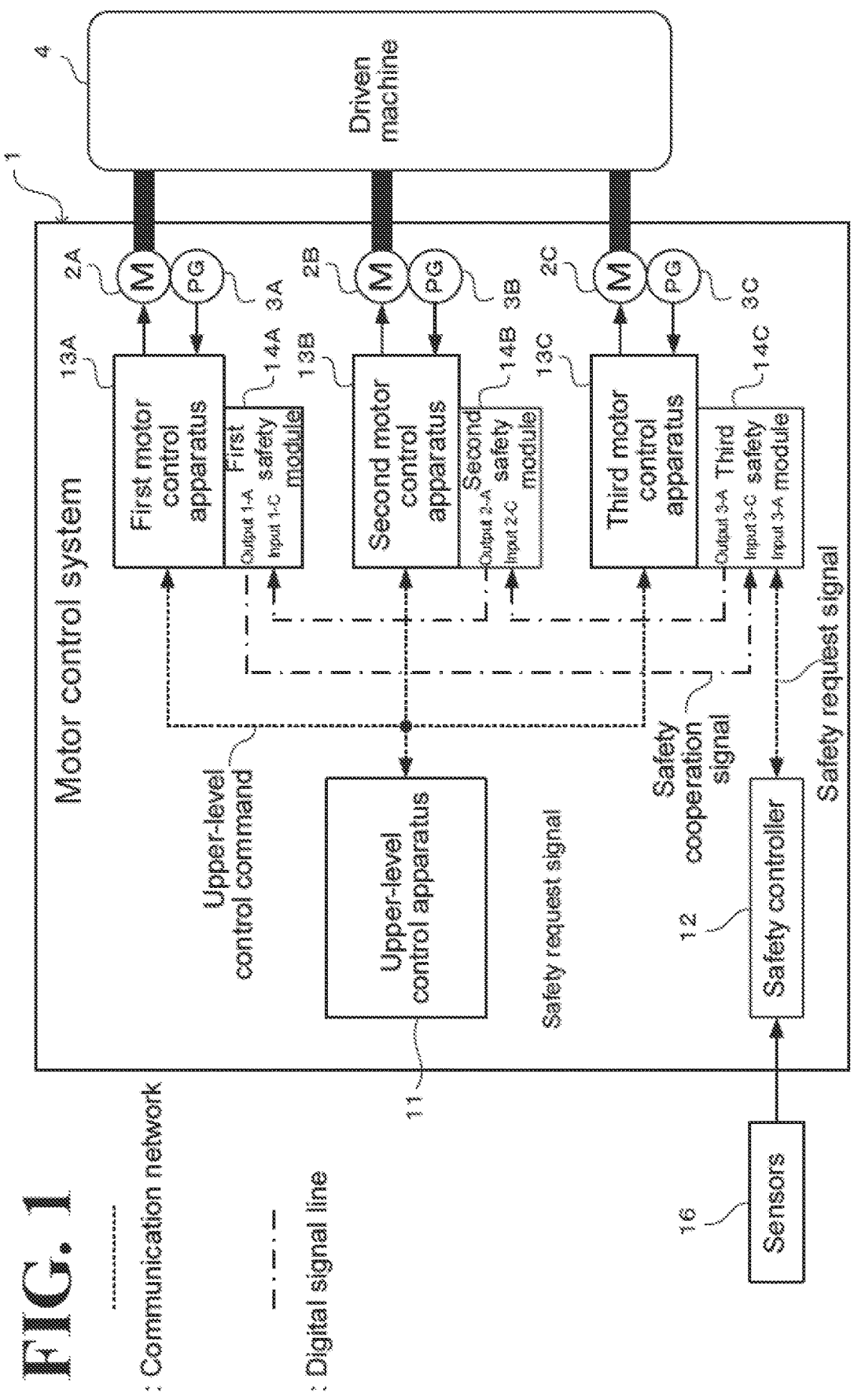
FIG. 1 is a functional block diagram of a schematic configuration of a motor control system according to an embodiment.

The embodiments will now be described with reference to the accompanying drawings, wherein like reference numerals designate corresponding or identical elements throughout the various drawings.

Schematic Configuration of Motor Control System

FIG. 1 is a functional block diagram of a schematic configuration of a motor control system 1 according to an embodiment.

As illustrated in FIG. 1, the motor control system 1 according to this embodiment includes motors 2, encoders 3, motor control apparatuses 13, safety modules 14, an upper-level control apparatus 11, and a safety controller 12.

It is to be noted that FIG. 1 illustrates how these components are connected to each other and illustrates flows of signals sent and received between the components, and that internal configurations of the components will be detailed later. In some of the drawings referred to in the following description, some signal lines are illustrated by broken lines, and these signal lines indicate that the corresponding signals are not being sent or received in the situations illustrated but may be sent or received in other situations between the components indicated by the broken lines. The above-described components will be schematically described below.

The motors 2 are three-phase alternating-current (AC) motors that are mechanically connected to a driven machine 4, such as an industrial machine and a robot, to drive the driven machine 4.

The encoders 3 are mechanically connected to the respective motors 2 and function to detect driving state quantities, such as driving position, of the motors 2.

Each of the motor control apparatuses 13 receives an upper-level control command input from the upper-level control apparatus 11, described later, and a driving state quantity of the corresponding motor 2 detected by the corresponding encoder 3. Based on the upper-level control command and the driving state quantity, the motor control apparatus 13 functions to control the driving of the motor 2.

The safety modules 14 are function extension devices additionally connected to the motor control apparatuses 13. When a safety request signal has been input into each of the safety modules 14 from the safety controller 12, described later, and a predetermined condition is satisfied after the safety request signal has been input, the safety module 14 functions to output a power supply breaking signal to the corresponding motor control apparatus 13 so as to forcibly decelerate and stop the corresponding motor 2.

The upper-level control apparatus 11 functions to output upper-level control commands to the motor control apparatuses 13. The upper-level control commands are for causing the motors 2 to make desired driving motions. Through power supply control performed by the motor control apparatuses 13, the upper-level control apparatus 11 controls the driving of the motors 2. It is to be noted that an upper-level control command is output in the form of a position command, a speed command, a torque command, or some other command.

From the driven machine 4 itself and/or various sensors 16 disposed around the driven machine 4, the safety controller 12 is capable of detecting an occurrence of a predetermined state in which the motors 2 should be decelerated and stopped. Upon detection of the predetermined state, the safety controller 12 functions to output, to the safety modules 14, a safety request signal corresponding to the predetermined state. It should be noted, however, that this example is not intended in a limiting sense; depending on the state detected by the sensors 16, the safety controller 12 may output the same safety request signal to the upper-level control apparatus 11 (this another example is not illustrated).

In this embodiment, the driven machine 4, which is controlled by the motor control system 1, has a three-axis configuration in which three motors 2A, 2B, and 2C cooperate with each other to drive the driven machine 4. The motor control system 1 includes three motor control apparatuses 13A, 13B, and 13C, which respectively correspond to the three motors 2A, 2B, and 2C, so that the three motors 2A, 2B, and 2C are controlled individually. The safety module 14A is connected to the first motor control apparatus 13A, the safety module 14B is connected to the second motor control apparatus 13B, and the safety module 14C is connected to the third motor control apparatus 13C. The first safety module 14A, the second safety module 14B, and the third safety module 14C are arranged in this order in the downward direction from the upper edge of FIG. 1.

As illustrated in FIG. 1, only the third safety module 14C, among the three safety modules 14A, 14B, and 14C, is connected to the safety controller 12 and thus capable of receiving the above-described safety request signal. In contrast, the safety modules 14A, 14B, and 14C are wired to each other so that a safety cooperation signal, described later, is sent and received between all the safety modules 14A, 14B, and 14C. The wiring configuration for sending the safety cooperation signal to and from the safety modules 14A, 14B, and 14C will be detailed later. The wiring for sending the upper-level control command to and from the upper-level control apparatus 11 and the motor control apparatuses 13A, 13B, and 13C is implemented by a "field network", which is a communication network (see the dotted lines in the drawing) compliant with a predetermined protocol. From a functional point of view, this configuration ensures that various kinds of commands and data can be sent and received bidirectionally. The same applies in the wiring for sending the safety request signal to and from the safety controller 12 and the third safety module 14C. In contrast, the wiring for sending the safety cooperation signal to and from the safety modules 14A, 14B, and 14C is implemented by a digital signal line (see single-dashed lines in FIG. 1) through which simple digital signals can be sent and received bidirectionally.

While the driven machine 4 is in operation, there may be an emergency in which it is necessary to stop the driven machine 4. When the driven machine has a plurality of axes, as in the driven machine 4, stopping the motors 2A, 2B, and 2C in an independent, random manner may cause damage to the internal mechanism of the driven machine 4. It is, therefore, preferable to perform safety control such that the motor control apparatuses 13A, 13B, and 13C cooperate to stop the motors 2A, 2B, and 2C in a time-series changing pattern suitable for the motors 2A, 2B, and 2C. Specifically, the safety control includes safety motion control and safety monitor control, which are performed at the same time. In the safety motion control, the motor control apparatuses 13A, 13B, and 13C respectively decelerate and stop the motors 2A, 2B, and 2C simultaneously in individual motion control patterns. In the safety monitor control, the safety modules 14A, 14B, and 14C monitor individual motion monitor patterns of the respective safety modules 14A, 14B, and 14C and monitor driving state quantities of the respective motors 2A, 2B, and 2C. The following description of the safety motion control performed in this embodiment assumes that the safety motion control is performed in a "active deceleration mode", which is a mode in which the motor control apparatuses 13A, 13B, and 13C themselves generate internal deceleration commands and decelerate and stop the respective motors 2A, 2B, and 2C based on the internal deceleration commands.

Configuration Details of Motor Control System, and Safety Control

Figure 2:
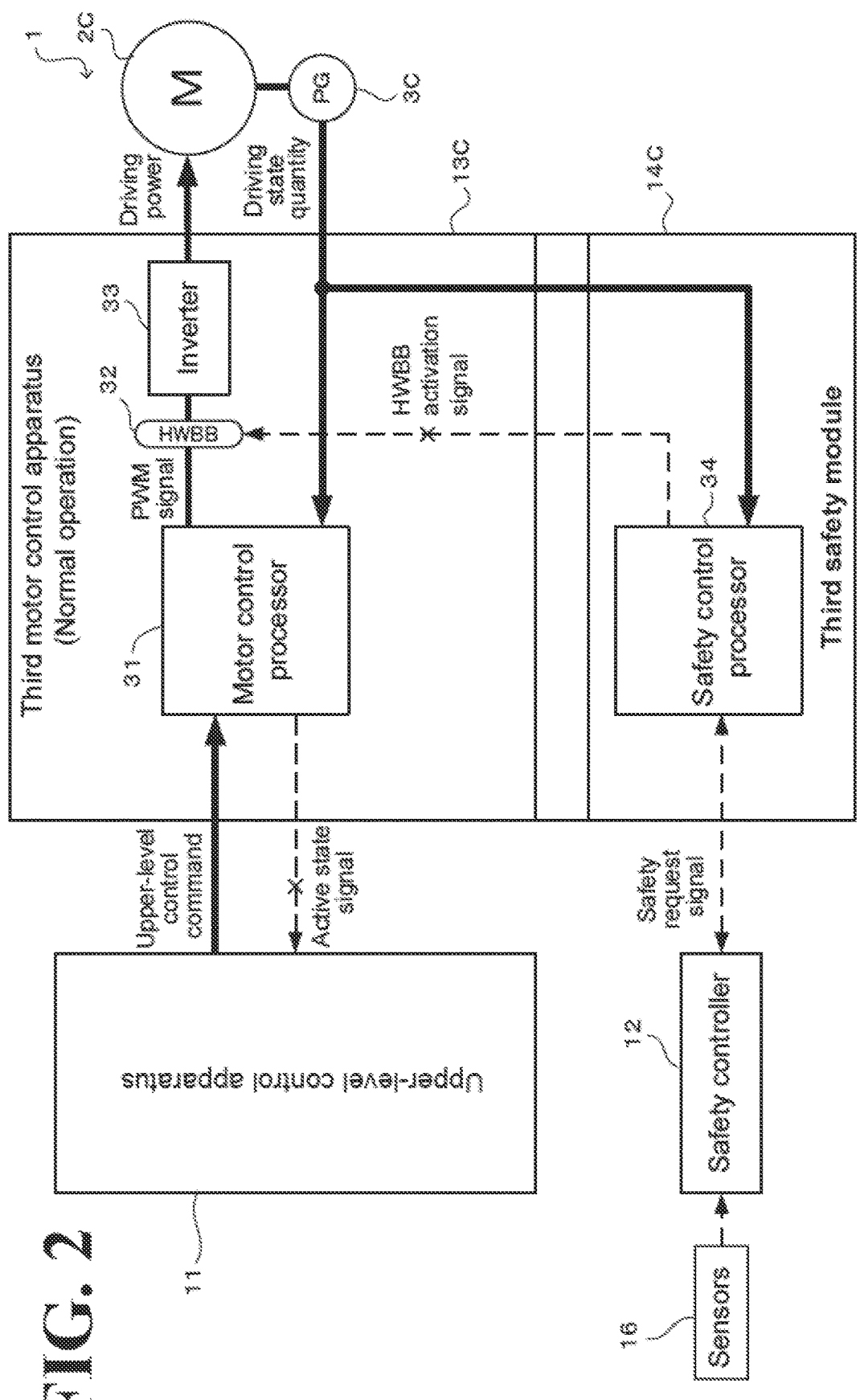
FIG. 2 illustrates flows of signals in the motor control system at normal operation time.
Figure 3:
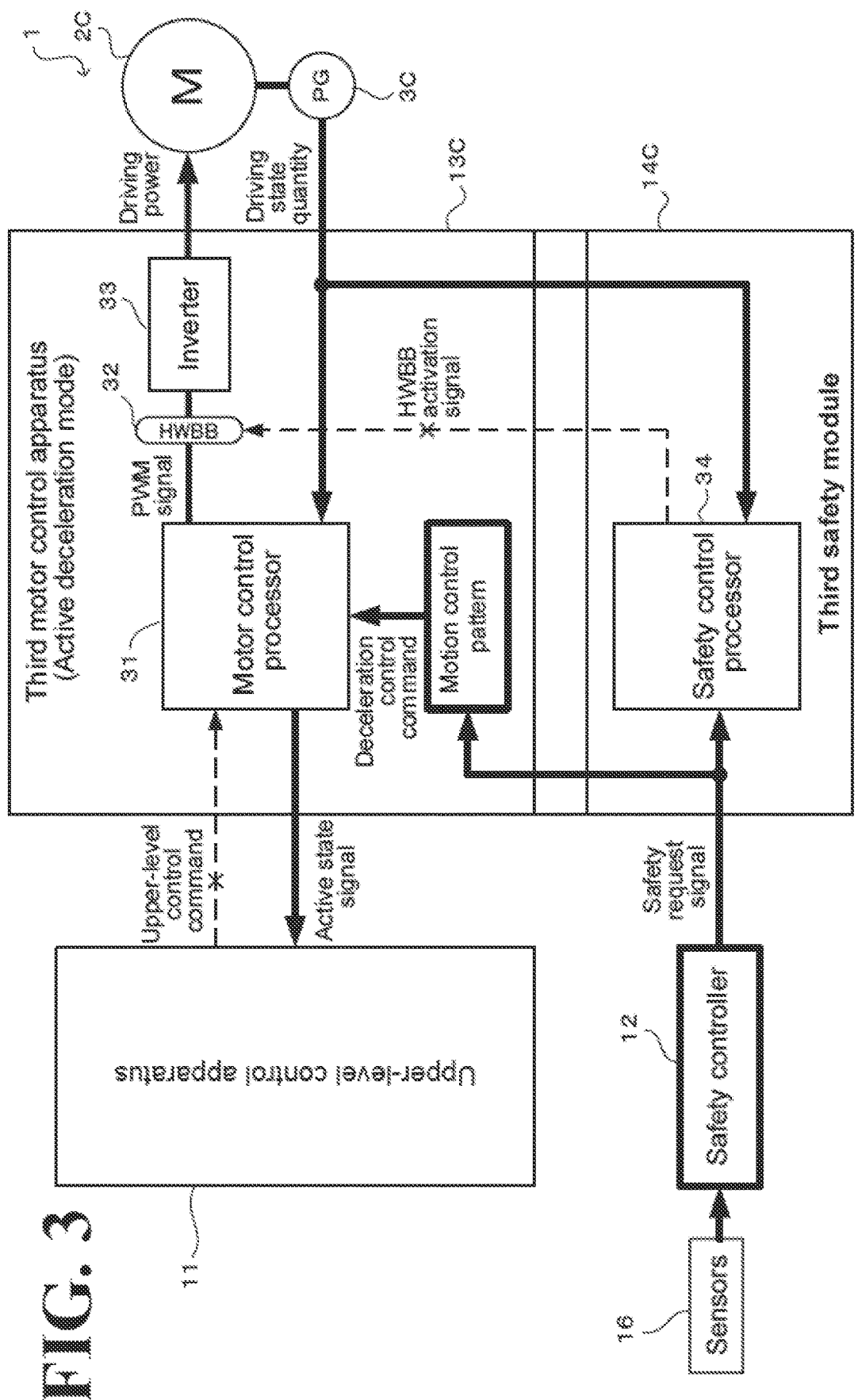
FIG. 3 illustrates flows of signals in the motor control system at the time of active deceleration mode.
Figure 4:
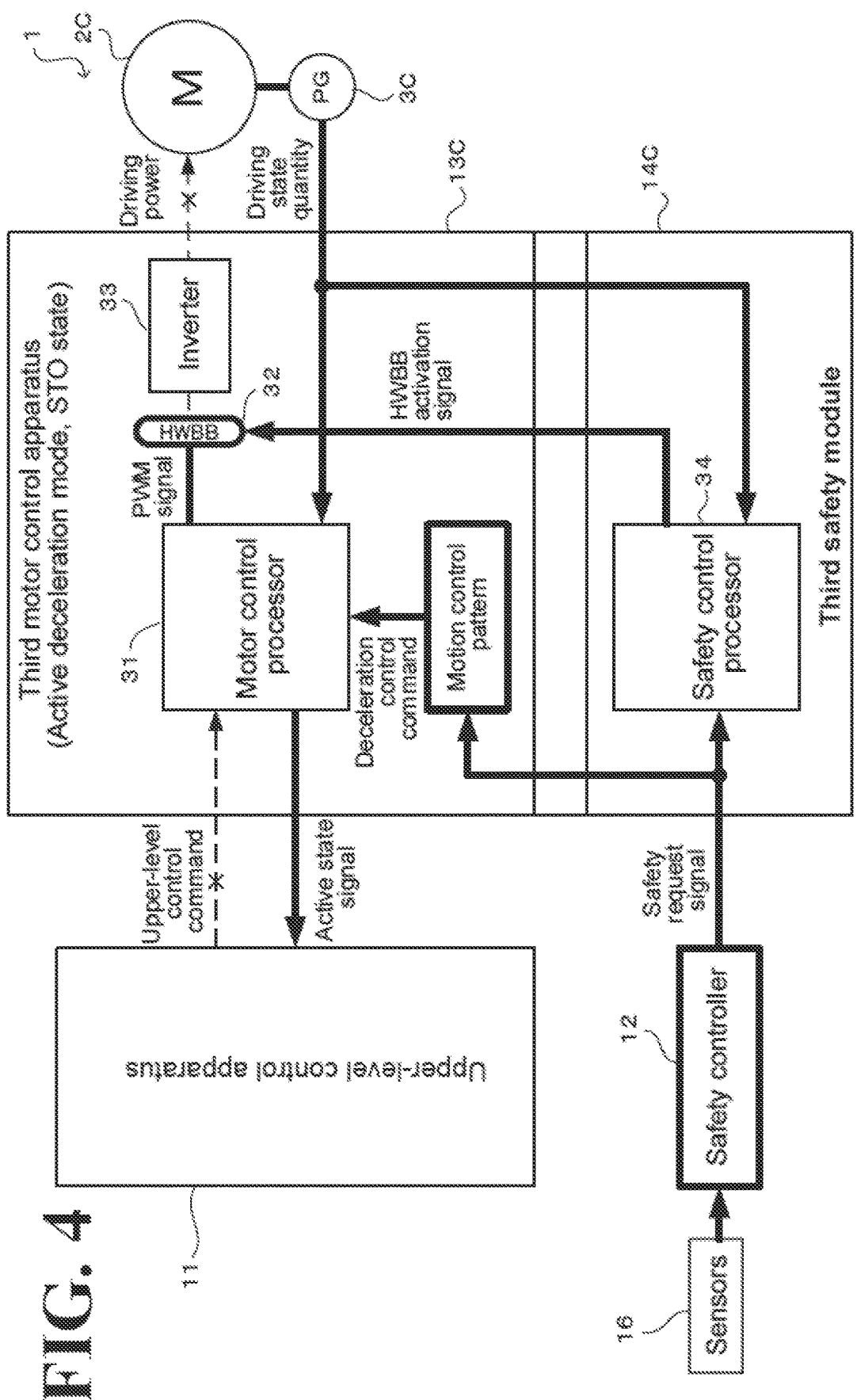
FIG. 4 illustrates flows of signals in the motor control system at STO state time.

FIGS. 2 through 4 illustrate flows of signals in the motor control system 1. FIG. 2 corresponds to normal operation time, FIG. 3 corresponds to the time of active deceleration mode (described later), and FIG. 4 corresponds to the time of STO state (described later). In FIGS. 2 through 4, some (specifically, HWBB 32 and inverter 33) of the components that the motor control apparatus 13C includes inside the motor control apparatus 13C are implemented by hardware circuits, while the function(s) of the motor control apparatus 13C and the safety module 14C are implemented by CPU-implemented software and illustrated in the form of software blocks. To avoid complicated illustration, FIGS. 2 through 4 illustrate configurations of the third motor control apparatus 13C and the third safety module 14C, and illustrate control performed by the third motor control apparatus 13C and the third safety module 14C. The illustrated configuration of the third motor control apparatus 13C also applies in the configurations of the first and second motor control apparatuses 13A and 13B, and the illustrated configuration of the third safety module 14C also applies in the configurations of the first and second safety modules 14A and 14B. Also, the illustrated control also applies in the first and second motor control apparatuses 13A and 13B and the first and second safety modules 14A and 14B (in which case the safety cooperation signal, described later, is sent and received). Also to avoid complicated illustration, the flows of the safety cooperation signal is not illustrated in FIGS. 2 through 4.

As illustrated in FIGS. 2 through 4, the motor control apparatus 13C includes, inside the motor control apparatus 13C, a motor control processor 31, the HWBB (Hard Wire Base Block) 32, and the inverter 33. The motor control processor 31 is a software block, and the HWBB 32 and the inverter 33 are hardware circuits, as described above. The safety module 14C includes a safety control processor 34 inside the safety module 14C. The safety control processor 34 is a software block. While in this embodiment the safety control processor 34 is implemented by a software block, the safety control processor 34 may be implemented by a hardware circuit or a combination of hardware circuits.

The motor control processor 31 functions to check, as a feedback signal, a driving state quantity of the motor 2C detected by the encoder 3C; and, while checking the driving state quantity of the motor 2C, perform power supply control of the motor 2C (specifically, switching control of the inverter 33 using a PWM signal, as described later) based on a predetermined driving control command (for example, an upper-level control command from the upper-level control apparatus 11).

The HWBB 32 (which is a non-limiting example of the power supply breaking circuit recited in the appended claims) includes semiconductor switching elements to switch between making and breaking of conduction of a PWM signal from the motor control processor 31 to the inverter 33. With the semiconductor switching elements, the HWBB 32 functions to break the output of the PWM signal upon input of an HWBB activation signal (which is a non-limiting example of the power supply breaking signal recited in the appended claims). In this manner, the HWBB 32 breaks supply of power to the motor 2C through the inverter 33.

The inverter 33 functions to: receive the PWM signal from the motor control processor 31; and, based on the PWM signal, convert power supplied from a commercial power source, not illustrated, into driving power for the motor 2C.

When the driving state quantity of the motor 2C detected by the encoder 3C (such as motor output position and motor output speed) is in excess of a motion monitor pattern, described later, the safety control processor 34 functions to output an HWBB activation signal to the HWBB 32 so as to activate the HWBB 32 (that is, break conduction of the PWM signal). The motion monitor pattern includes a plurality of kinds of time-series changing patterns (not illustrated) specified by safety standards, and one pattern arbitrarily selected from the time-series changing patterns by a setting operation, described later, is applied to the safety control processor 34 (which will be detailed later).

As illustrated in FIG. 2, at the time of normal operation of the driven machine 4, the upper-level control apparatus 11 generates an upper-level control command for causing the motor 2C to make predetermined driving, and outputs the upper-level control command to the motor control apparatus 13C. Upon receipt of the upper-level control command, the motor control apparatus 13C inputs the upper-level control command into the motor control processor 31 without making any changes to the upper-level control command. Then, the motor control processor 31 outputs a PWM signal based on the upper-level control command while checking, as a feedback signal, the driving state quantity detected by the encoder 3C. During the normal operation time, no HWBB activation signal is input into the motor control apparatus 13C from the safety control processor 34. This allows the PWM signal output from the motor control processor 31 to be input into the inverter 33 through the HWBB 32, causing driving power corresponding to the PWM signal to be supplied to the motor 2C. This enables the motor control system 1 as a whole to stably drive the motor 2C based on the upper-level control command from the upper-level control apparatus 11. It is to be noted that during the normal operation time, no detection signals are output from the sensors 16, and no safety request signals corresponding to the detection signals are output from the safety controller 12.

When, as illustrated in FIG. 3, a detection signal indicating an abnormality is output from any of the sensors 16 while the driven machine 4 is in normal operation, the safety controller 12 generates a safety request signal corresponding to the sensor 16 and outputs the safety request signal to the safety module 14C. Through the safety module 14C that has received the safety request signal, the motor control apparatus 13C decelerates and stops the motor 2C by performing the above-described active deceleration mode.

In the active deceleration mode illustrated in FIG. 3, the motor control apparatus 13C generates an internal deceleration command inside the motor control apparatus 13C. The internal deceleration command is based on a predetermined motion control pattern associated with a safety function. Then, the motor control apparatus 13C inputs the internal deceleration command into the motor control processor 31 as a deceleration control command. That is, instead of the upper-level control apparatus 11, the motor control apparatus 13C itself autonomously performs deceleration control and/or stopping control of the motor 2C. Performing the active deceleration mode eliminates the need for the system configuration of inputting a safety request signal into the upper-level control apparatus 11. Specifically, the motor control processor 31 outputs an active state signal to the upper-level control apparatus 11, causing the upper-level control apparatus 11 to stop outputting an upper-level control command.

As described above, when the safety control processor 34 of the safety module 14C has received a safety request signal from the safety controller 12, and when the driving state quantity of the motor 2C is in excess of the predetermined motion monitor pattern, the safety control processor 34 outputs an HWBB activation signal to the HWBB 32 so as to activate the HWBB 32 (that is, break conduction of the PWM signal).

Upon activation of the HWBB 32, the HWBB 32 breaks conduction of the PWM signal from the motor control processor 31, causing the inverter 33 to stop supply of driving power to the motor 2C. This state is referred to as STO (Safety Torque Off) state, as illustrated in FIG. 4. Turning the third motor control apparatus 13 C and the third safety module 14C into the STO state is one of the safest and most reliable safety control options in that the motor 2C can be decelerated and stopped reliably and quickly, although the recoverability of the driven machine 4 operating again is comparatively low.

Features of this Embodiment

As has been described hereinbefore, the motor control system 1 controls the motors 2, which serve as driving sources of the driven machine 4. In particular circumstances such as in an emergency, the motor control system 1 controls deceleration motions and/or stopping motions of the motors 2 based on various motion control patterns (such as deceleration pattern and stopping pattern) specified by safety standards. In relation to this configuration, each safety module 14 includes the safety control processor 34. The safety control processor 34 compares a motion monitor pattern corresponding to any one of the motion control patterns with the driving state quantity of the corresponding motor 2 that has been detected. When the motion monitor pattern and the driving state quantity is in a particular relationship, the safety control processor 34 breaks the supply of power to the motor 2.

Many driven machines controllable by the motor control system 1 are driven by a plurality of motors (as in the driven machine 4 driven by the plurality of motors 2A, 2B, and 2C). In light of this, the motor control system 1 includes the motor control apparatuses 13A, 13B, and 13C so that the motor control apparatuses 13A, 13B, and 13C respectively correspond to the plurality of motors 2A, 2B, and 2C and control the driving of the plurality of motors 2A, 2B, and 2C individually. When an emergency occurs during this driving control using a plurality of axes, the motor control system 1 performs safety motion control and safety monitor control at the same time. In the safety motion control, the motor control apparatuses 13A, 13B, and 13C cooperate with each other to simultaneously decelerate and stop the motors 2 using individual motion control patterns. In the safety monitor control, the safety modules 14 monitor individual motion monitor patterns of the respective safety modules 14 and monitor driving state quantities of the respective motors 2.

For a motor control system to employ this configuration, a comparatively large number of wires are necessary for sending signals between the plurality of motor control apparatuses so that the signals specify the start of the safety motion control (performed by the motor control apparatuses cooperating with each other) and the safety monitor control. This may result in a complicated wiring configuration.

In light of the circumstances, in this embodiment, each motor control apparatus 13 includes a safety request input receiving device (any one of the input ports, described later), a safety cooperation input receiving device (any one of the input ports, described later), and a safety cooperation output device (any one of the output ports, described later). Into the safety request input receiving device, a safety request signal is input from outside the motor control apparatus 13. Into the safety cooperation input receiving device, a safety cooperation signal is input from outside the motor control apparatus 13. The safety cooperation signal is for causing the motor control apparatus 13 to cooperate with other apparatuses or devices (that is, with the other motor control apparatuses 13) to perform control. Through the safety cooperation output device, the motor control apparatus outputs the safety cooperation signal to outside the motor control apparatus 13. Also, this embodiment includes a safety control processor. Upon input of at least one signal among the safety request signal and the safety cooperation signal from the outside, the safety control processor monitors a relationship between a predetermined motion monitor pattern and a driving state quantity and, at the same time, outputs the safety cooperation signal to the outside.

That is, the safety request signal and the safety cooperation signal are clearly distinguished from each other. The safety request signal is defined as a signal that is input from an external apparatus or device such as the safety controller 12 and that demands that at least the safety monitor control be performed. The safety cooperation signal is defined as a signal that is input and output to and from the outside and that demands that the motor control apparatus 13 cooperate with the other motor control apparatuses 13 (that is, with other apparatuses or devices) to start at least the safety monitor control. In order to deal with the safety request signal and the safety cooperation signal thus defined, the safety control processor (which causes safety monitor control to be performed in the corresponding motor control apparatus 13) is provided with an input device dedicated to the safety request signal and with an input device and an output device dedicated to the safety cooperation signal. This configuration simplifies the wiring configuration in the motor control system 1 through which the demand for the safety monitor control is sent between the motor control apparatuses 13. This results in a lower-cost configuration. A specific structure and processing for implementing this configuration will be described below.

Wiring Configuration between Safety Modules and Motions

Figure 5:
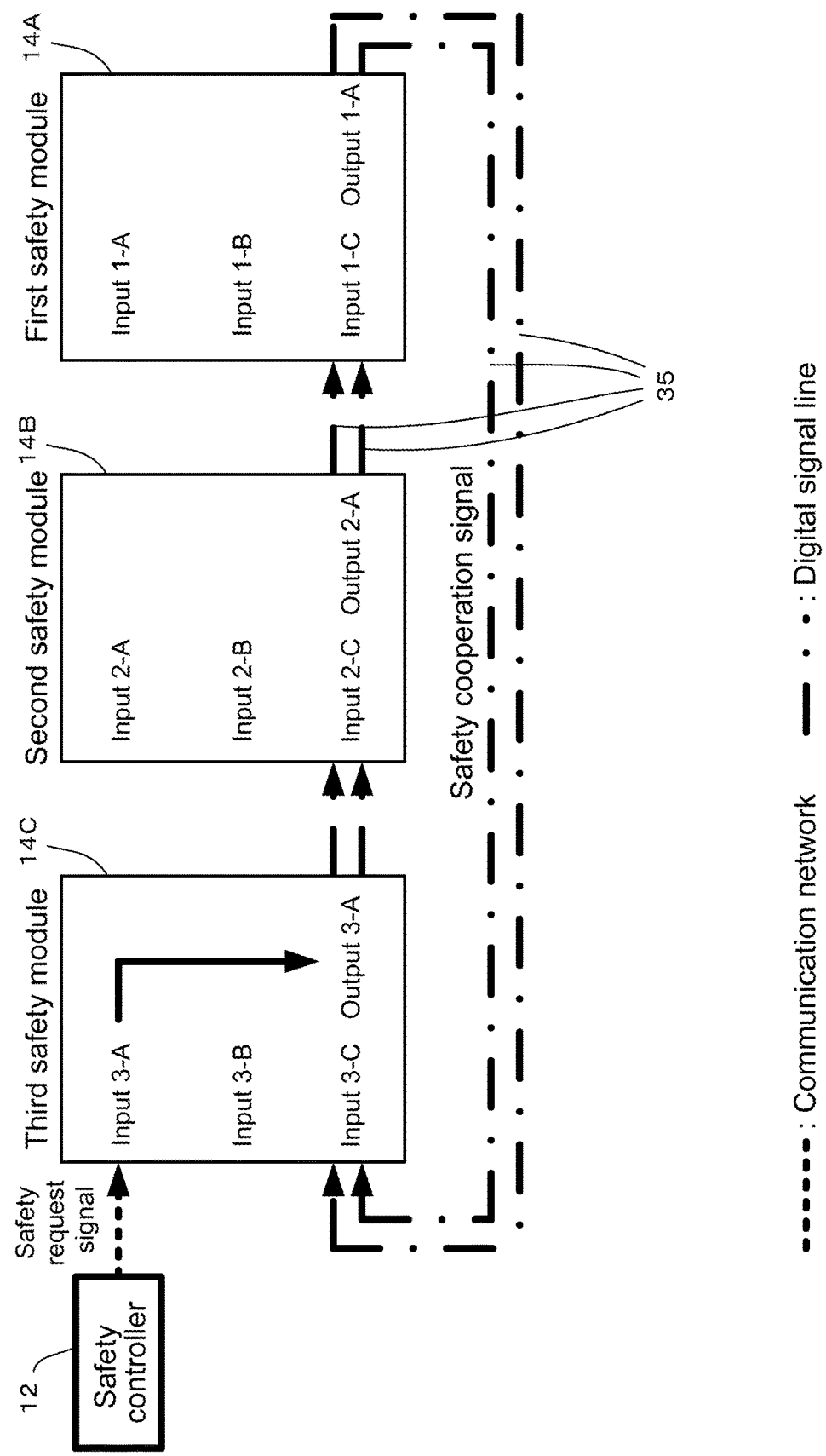
FIG. 5 illustrates an example wiring configuration in which safety cooperation signals are sent and received between three safety modules.

FIG. 5 illustrates an example wiring configuration in which a safety cooperation signal is sent and received between the three safety modules 14 according to this embodiment. Referring to FIG. 5, each three safety module 14 includes three input ports (1-A, 1-B, and 1-C; 2-A, 2-B, and 2-C; and 3-A, 3-B, and 3-C) and a single output port (1-A, 2-A, and 3-A). These input ports and output ports are ports through which simple digital signals can be sent and received bidirectionally.

As described earlier, in this embodiment, the safety controller 12 is connected to only the input port 3-A (safety request input receiving device) of the third safety module 14C through a communication network, so that a safety request signal is input only into the third safety module 14C. In addition to this wiring configuration, ring-shaped signal transmission paths 35 are formed between the three safety modules 14A, 14B, and 14C. Each of the signal transmission paths 35 is a digital signal line and used to send a safety cooperation signal between the three safety modules 14A, 14B, and 14C. Specifically, a digital signal line is formed between the output port 3-A (which is a non-limiting example of the safety cooperation output device recited in the appended claims) of the third safety module 14C and the input port 2-C (which is a non-limiting example of the safety cooperation input receiving device recited in the appended claims) of the second safety module 14B. Through the digital signal line, the safety cooperation signal is sent from the output port 3-A to the input port 2-C one-directionally. Another digital signal line is formed between the output port 2-A (which is a non-limiting example of the safety cooperation output device recited in the appended claims) of the second safety module 14B and the input port 1-C (which is a non-limiting example of the safety cooperation input receiving device recited in the appended claims) of the first safety module 14A. Through the digital signal line, the safety cooperation signal is sent from the output port 2-A to the input port 1-C one-directionally. Still another digital signal line is formed between the output port 1-A (which is a non-limiting example of the safety cooperation output device recited in the appended claims) of the first safety module 14A and the input port 3-C (which is a non-limiting example of the safety cooperation input receiving device recited in the appended claims) of the third safety module 14C. Through the digital signal line, the safety cooperation signal is sent from the output port 1-A to the input port 3-C one-directionally. The wiring configurations of these digital signal lines make up the signal transmission paths 35, and in this embodiment, the signal transmission paths 35 have a redundant (multiplicate) structure of two parallel wirings for "fail-safe" purposes.

Upon input of a safety request signal into the input port 3-A of the third safety module 14C from the safety controller 12, the safety control (safety motion control and safety monitor control) in the active deceleration mode illustrated in FIGS. 3 and 4 is performed in the third safety module 14C. At the same time, a safety cooperation signal is output from the output port 3-A of the third safety module 14C and input into the input port 2-C of the second safety module 14B. Upon input of the safety cooperation signal into the second safety module 14B, the safety control is performed in the active deceleration mode also in the second safety module 14B. At the same time, the safety cooperation signal is output from the output port 2-A of the second safety module 14B and input into the input port 1-C of the first safety module 14A. Upon input of the safety cooperation signal into the first safety module 14A, the safety control is performed in the active deceleration mode also in the first safety module 14A. At the same time, the safety cooperation signal is output from the output port 1-A of the first safety module 14A and input into the input port 3-C of the third safety module 14C.

Thus, in a system emergency, a safety request signal is output from the safety controller 12. Upon output of the safety request signal, a safety cooperation signal is transmitted in a one-directional, end-to-end manner between the three safety modules 14A, 14B, and 14C through the signal transmission paths 35, causing the three safety modules 14A, 14B, and 14C to start performing safety control simultaneously.

Specific Processing Configuration of Safety Control Processor

As described above, a large number of motion patterns each made up of a combination of a motion control pattern and a motion monitor pattern are specified by safety standards. In this respect, the safety control processor 34 of each of the safety modules 14A, 14B, and 14C monitors the motion monitor pattern to check if a driving state quantity corresponding to the motion monitor pattern is in excess (that is, if the driving state quantity is Fault). In this embodiment, the safety control processor 34 includes a plurality of safety functions implemented in terms of software. Each of the safety functions is capable of individually selecting a motion monitor pattern to be monitored and comparing the selected motion monitor pattern with the driving state quantity.

Figure 6:
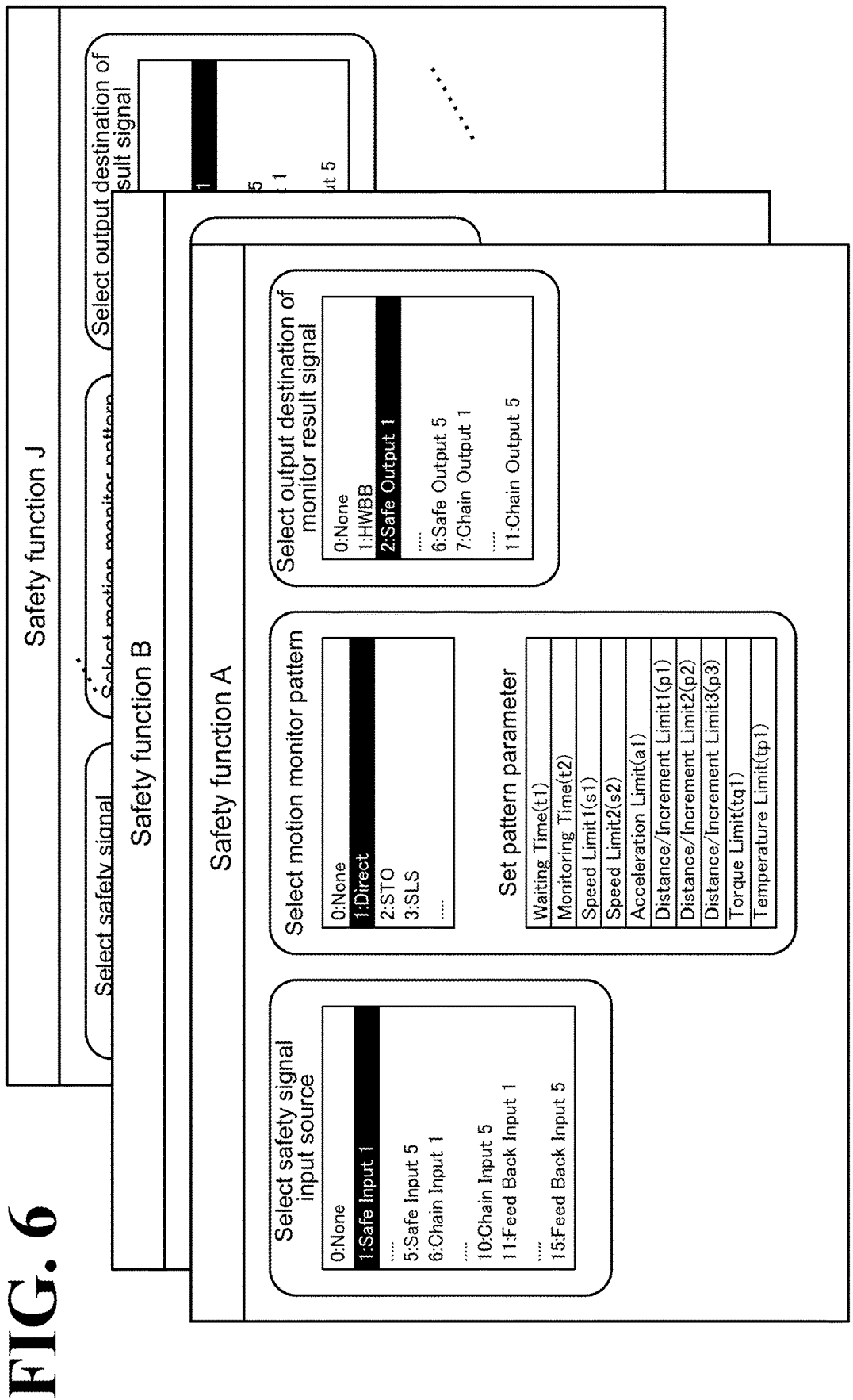
FIG. 6 illustrates example setting screens on which selection settings are performed in safety functions of a safety control processor.

FIG. 6 illustrates example setting screens on which selection settings are performed on an individual safety function basis. Referring to FIG. 6, a safety control manipulation part includes 10 safety functions: a safety function A, a safety function B, a safety function C, a safety function D, a safety function E, a safety function F, a safety function G, a safety function H, a safety function I, and a safety function J (it is to be noted that the safety functions C to I are not illustrated in FIG. 6). The safety functions can be selected and subjected to setting individually by an input operation using a suitable engineering tool (not illustrated).

All the safety functions A to J have the same setting items, which are roughly divided into three setting items: "Select safety signal input source", "Select motion monitor pattern", and "Select output destination of monitor result signal". "Select safety signal input source" is a setting item on which to select an input source of a safety request signal or a safety cooperation signal, which causes this safety function to start operating. In the example illustrated in FIG. 6, the choices provided on "Select safety signal input source" are: "0 (: None)", which is selected when allowing no safety request signal or safety cooperation signal to be input; "1 (: Safe Input 1)", "2 (: Safe Input 2)", "3 (: Safe Input 3)", "4 (: Safe Input 4)", and "5 (: Safe Input 5)", which are selected when determining the source safety controller 12 from which the safety request signal is to be input, under the assumption that there are a maximum of five safety controllers 12; "1 (: Chain Input 1)", "2 (: Chain Input 2)", "3 (: Chain Input 3)", "4 (: Chain Input 4)", "5 (: Chain Input 5)", and "6 (: Chain Input 6)", which are selected when determining the source safety module 14 from which the safety cooperation signal is to be input, under the assumption that there are a maximum of five other safety modules 14 (motor control apparatuses 13); and "11 (: Feed Back Input 11)", "12 (: Feed Back Input 12)", "13 (: Feed Back Input 13)", "14 (: Feed Back Input 14)", and "15 (: Feed Back Input 15)", which are selected when determining the source sensor from which an input signal (described later) is to be input, under the assumption that there are a maximum of five other sensors than the sensor 16. Any one of these choices can be selected.

"Select motion monitor pattern" is a setting item on which to select the kind of motion monitor pattern to be checked by this safety function. Example motion monitor patterns include, but are not limited to, those specified by the international standard IEC 61800-5-2, such as Safe Base Block Function (SBB (STO)), Safely Limited Speed Monitor Function (SLS), and Safe Position Monitor With-delay Function (SPM-D (SS2)). Processing details using these functions are disclosed in, for example, JP 6369590B, which is incorporated herein in this entirety and will not be elaborated upon here.

In the example illustrated in FIG. 6, the choices provided on "Select motion monitor pattern" are: "0 (: None)", which is selected when no motion monitor pattern is to be checked; "1 (: Direct)", which is selected when a comparison-monitoring result is to be output without performing motion monitor control; "2 (: STO)", which is selected when determining on a motion monitor pattern that is based on Safe Base Block Function (SBB) (that is, a pattern in which STO is implemented immediately after input of the safety request signal); and "3 (: SLS)", which is selected when determining on a motion monitor pattern that is based on Safely Limited Speed Monitor Function (SLS). Any one of these choices can be selected. It is to be noted that other motion monitor patterns than the above-described motion monitor patterns are not illustrated in FIG. 6. Also on "Select motion monitor pattern", there are pattern parameters that can be set to define changes with time of the shape of the selected motion monitor pattern. It is to be noted that on the part of the motor control apparatus 13, the motion control pattern corresponding to the motion monitor pattern selected on "Select motion monitor pattern" is made to function simultaneously with the time at which this safety function functions. This ensures that a motion control pattern and a motion monitor pattern of the same kind are implemented simultaneously.

"Select output destination of monitor result signal" is a setting item on which to select the output destination of a monitor result signal. The monitor result signal indicates the result of comparison and monitoring of this the safety function at the present point of time (that is, indicates whether Fault is found). In the example illustrated in FIG. 6, the choices provided on "Select output destination of monitor result signal" are: "0 (: None)", which is selected when no monitor result signal is to be output; "1 (: HWBB)", which is selected when the monitor result signal is to be output, as it is, as an HWBB activation signal; "2 (: Safe Output 1)", "3 (: Safe Output 2)", "4 (: Safe Output 3)", "5 (: Safe Output 4)", and "6 (: Safe Output 5)", which are selected when determining the output destination from among the five safety controllers 12; and "7 (: Chain Output 1)", "8 (: Chain Output 2)", "9 (: Chain Output 3)", "10 (: Chain Output 4)", and "11 (: Chain Output 5)", which are selected when determining the output destination from among the five other safety modules 14. Any one of these choices can be selected. It is to be noted that when any one of the other safety modules 14 has been selected as the output destination, the monitor result signal is output as a safety cooperation signal.

Figure 7:
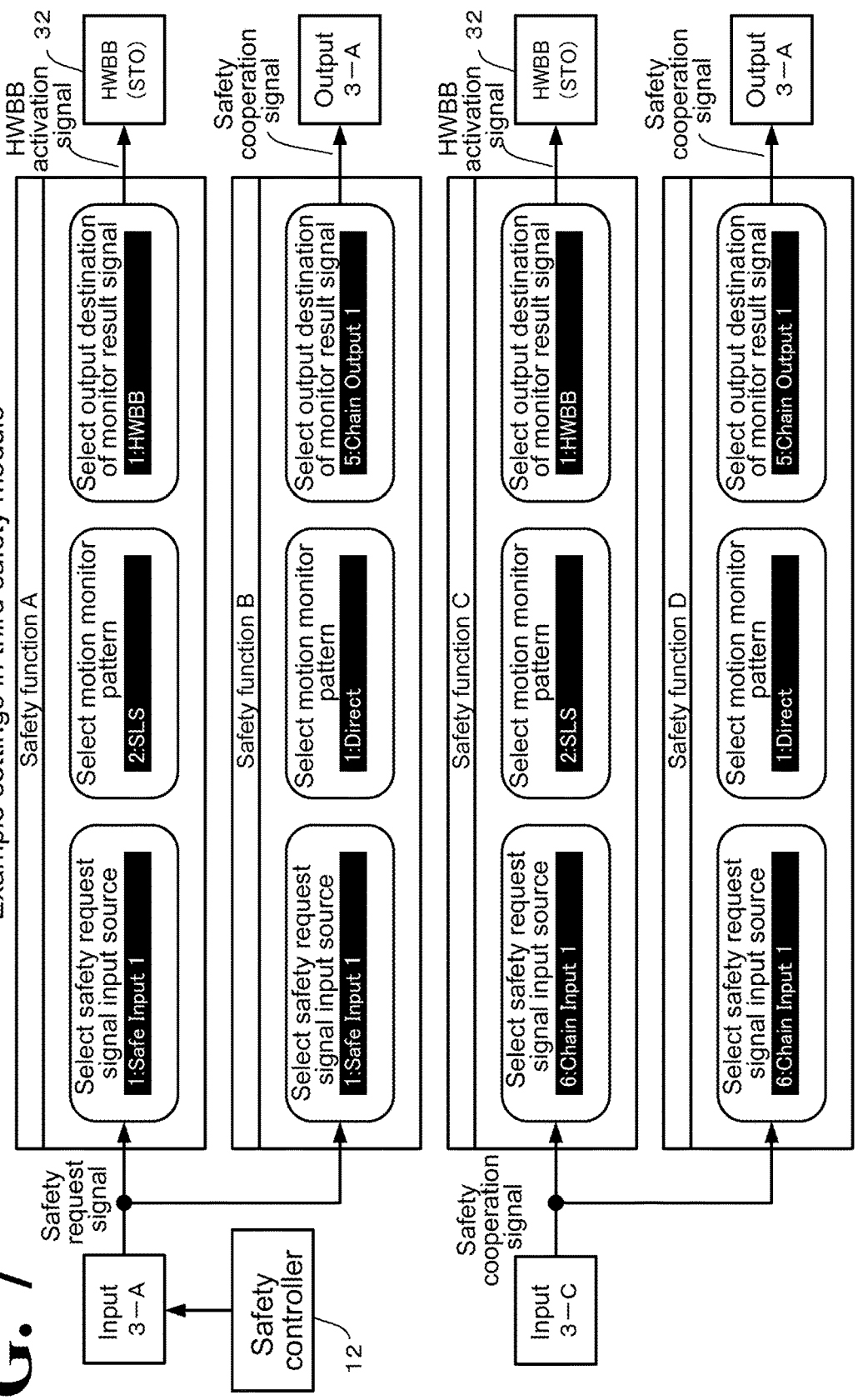
FIG. 7 illustrates example settings in safety functions for implementing processing functions of a third safety module.

FIG. 7 illustrates example settings of the above-described plurality of safety functions for implementing the processing functions of the third safety module 14C illustrated in FIG. 5. To avoid complicated illustration, some elements of the setting items are not illustrated in FIG. 7.

Referring to FIG. 7, on "Select safety signal input source" of the safety function A, the input port 3-A ("Safe Input 1") connected to one safety controller 12 is selected as the input source; on "Select motion monitor pattern" of the safety function A, the motion monitor pattern based on Safely Limited Speed Monitor Function (SLS) is selected; and on "Select output destination of monitor result signal" of the safety function A, the HWBB 32 is selected as the output destination. The processing in the safety function A ensures that upon input of a safety request signal at normal operation time, the motor speed is controlled and monitored in the motion control pattern and the motion monitor pattern based on Safely Limited Speed Monitor Function (SLS). When the driving state quantity (motor speed in the case of SLS) is in excess relative to the motion monitor pattern, a monitor result signal is output as an activation signal for the HWBB 32, resulting in an STO state (motor stop state), in which supply of power to the motor 2C is broken.

On "Select safety signal input source" of the safety function B, the input port 3-A ("Safe Input 1")connected to one safety controller 12 is selected as the input source; on "Select motion monitor pattern" of the safety function B, direct output of the comparison-monitoring result (safety cooperation signal) is selected ("Direct"); and on "Select output destination of monitor result signal" of the safety function B, the output port 3-A ("Chain Output 1") of another safety module 14 (in this case, the second safety module 14B) is selected as the output destination. The processing in the safety function B ensures that immediately after input of the safety request signal at normal operation time, the safety cooperation signal is output from the output port 3-A.

On "Select safety signal input source" of the safety function C, the input port 3-C ("Chain Input 1") of another safety module 14 (in this case, the first safety module 14A) is selected as the input source; on "Select motion monitor pattern" of the safety function C, the motion monitor pattern based on Safely Limited Speed Monitor Function (SLS) is selected; and on "Select output destination of monitor result signal" of the safety function C, the HWBB 32 is selected as the output destination. The processing in the safety function C ensures that upon input of a safety cooperation signal into the input port 3-C from the first safety module 14A at normal operation time, the motor speed is controlled and monitored in the motion control pattern and the motion monitor pattern based on Safely Limited Speed Monitor Function (SLS). When the driving state quantity (motor speed in the case of SLS) is in excess relative to the motion monitor pattern, a monitor result signal is output as an activation signal for the HWBB 32, resulting in an STO state (motor stop state), in which supply of power to the motor 2C is broken.

On "Select safety signal input source" of the safety function D, the input port 3-C ("Chain Input 1") of another safety module 14 (in this case, the first safety module 14A) is selected as the input source; on "Select motion monitor pattern" of the safety function D, direct output of the comparison-monitoring result (safety cooperation signal) is selected ("Direct"); and on "Select output destination of monitor result signal" of the safety function D, the output port 3-A ("Chain Output 1") of another safety module 14 (in this case, the second safety module 14B) is selected as the output destination. The processing in the safety function D ensures that immediately after input of a safety cooperation signal into the input port 3-C from the first safety module 14A at normal operation time, the safety cooperation signal is output from the output port 3-A.

The other safety functions E to J are stopped functioning by selecting "None" on any one of "Select safety signal input source", "Select motion monitor pattern", and "Select output destination of monitor result signal". By performing the processings in the plurality of safety functions in a parallel manner, the functions of the third safety module 14C are implemented. It is to be noted that the first safety module 14A and the second safety module 14B each may be set in a manner similar to the manner in which the safety function C or the safety function D is set. In the safety function C, however, "Select motion monitor pattern" is optional, and, therefore, it is possible to set the safety function D without setting the safety function C.

Figure 8:
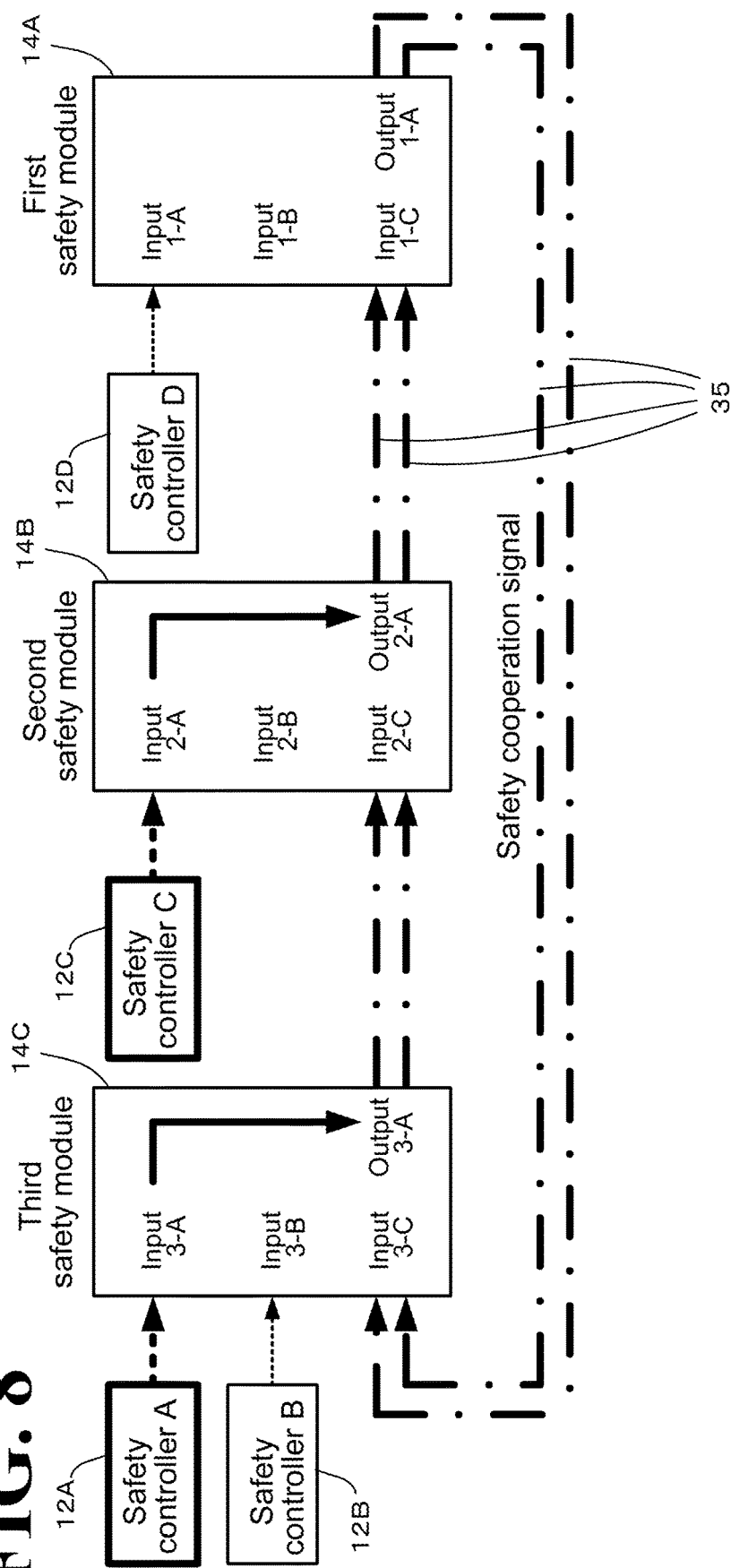
FIG. 8 illustrates an example wiring configuration in which each of a plurality of safety modules is connected with a different safety controller.

By setting the safety functions in the above-described manner, a wiring configuration having a higher degree of freedom is provided between the plurality of safety modules 14A, 14B, and 14C. For example, the plurality of safety modules 14A, 14B, and 14C may be connected with different safety controllers 12A to 12D, as illustrated in FIG. 8. In this configuration, the connections of the safety controllers 12A to 12D may be individually dealt with by setting a pair of safety functions equivalent to the safety functions A and B in each safety module. This ensures that upon output of a safety request signal from any one of the plurality of safety controllers 12A to 12D, all the safety modules 14A, 14B, and 14C cooperate to start performing safety control simultaneously. When a plurality of safety controllers 12 are connected to one safety module 14, a different motion monitor pattern may be set for each of the safety controllers 12 (on an individual safety request signal basis and/or an individual safety function basis).

Details of Safety Cooperation Signals

Figure 9:
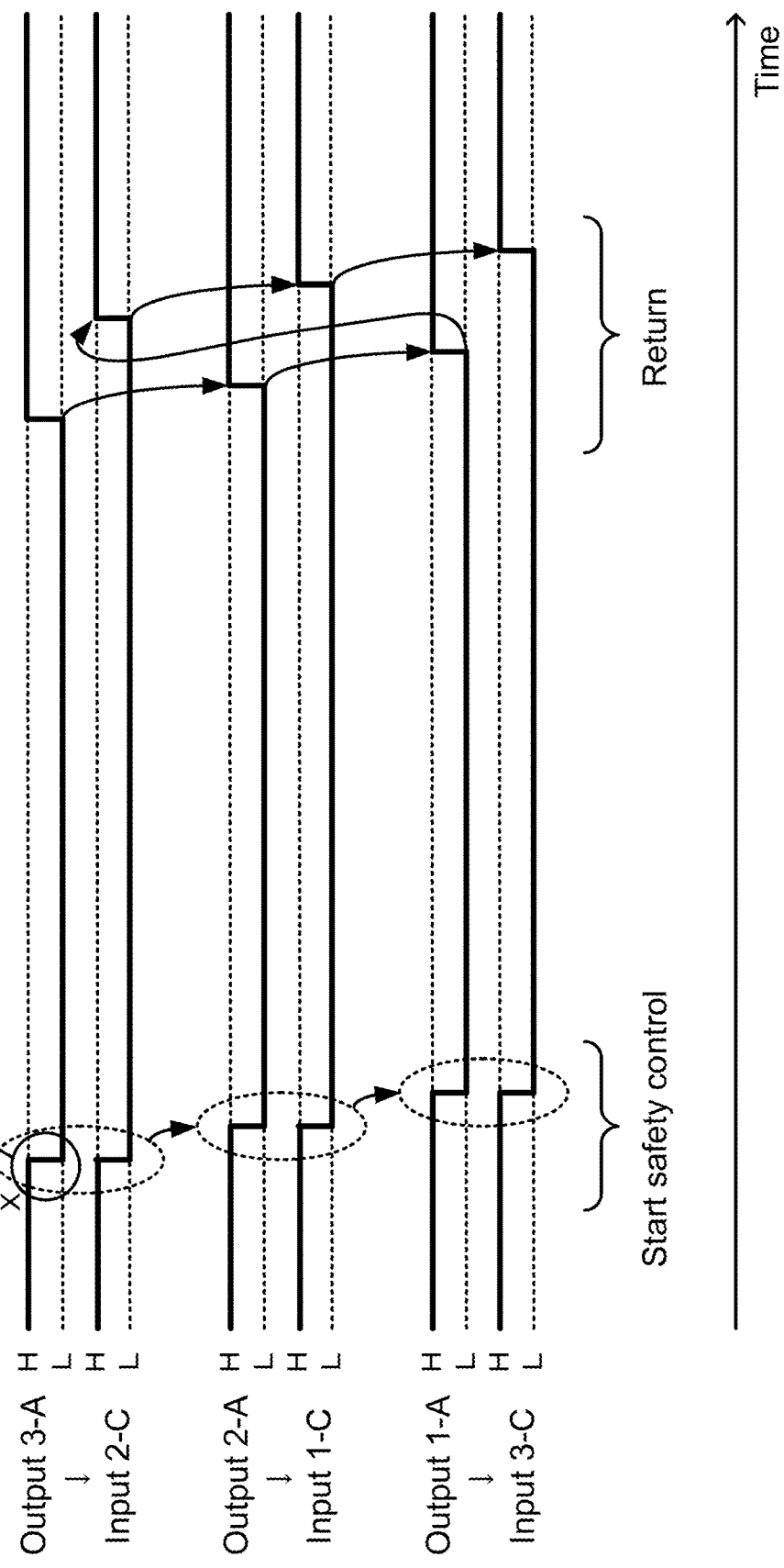
FIG. 9 illustrates example time charts of the safety cooperation signals sent and received between the three safety modules.

FIG. 9 illustrates example time charts of safety cooperation signals sent and received between the three safety modules 14A, 14B, and 14C. The example illustrated in FIG. 9 corresponds to the wiring configuration illustrated in FIG. 5. That is, the third safety module 14C, which is the only safety module 14 connected to the safety controller 12, starts outputting a safety cooperation signal, first of all safety modules 14. The safety cooperation signal is transmitted throughout the other safety modules 14, and the third safety module 14C stops outputting the safety cooperation signal and returns to normal operation, first of all safety modules 14.

In this embodiment, the safety cooperation signal is a binary digital signal having H level and L level. At L level, the digital signal is a "negative-logic signal" and regarded as a safety cooperation signal, for the following reason. In actual applications, the driven machine 4 may be used in areas of work sites large enough that the motor control apparatuses 13A, 13B, and 13C (the safety modules 14A, 14B, and 14C) are installed at locations far away from each other, making the cables of the signal transmission paths 35 longer in length to connect the motor control apparatuses 13A, 13B, and 13C to each other. If the signal cables are disconnected, the signal level decreases to low level. Even at low level, however, a negative-logic safety cooperation signal can be transmitted throughout the motor control apparatuses 13A, 13B, and 13C, enabling them to start performing safety monitor control. Immediately before the safety modules 14A, 14B, and 14C output negative-logic safety cooperation signals, test signals (test pulses) in the form illustrated in the enlarged part of circle X in FIG. 9 is output. These test signals are for the purpose of determining whether an input safety cooperation signal is a signal that has been output normally or a signal resulting from wiring disconnection.

As described above, the signal transmission paths 35 have a multiplicate structure through which to transmit safety cooperation signals between the safety modules 14A, 14B, and 14C. The two signal transmission paths 35 have slightly different forms of transmitting the safety cooperation signals. Specifically, in order to start safety control, each of the safety modules 14A, 14B, and 14C outputs two safety cooperation signals simultaneously through the two signal transmission paths 35 (that is, changes the signals to L level) In this respect, each of the safety modules 14A, 14B, and 14C meets with a difference between the time when each safety module detects input of external safety cooperation signals and the time when the safety module outputs its own safety cooperation signals, that is, there occurs a delay equivalent to the period of time necessary for the processing in the safety function D.

When the safety modules 14A, 14B, and 14C stop outputting the safety cooperation signals, that is, when the safety modules 14A, 14B, and 14C return to normal operation, each safety module stops outputting the safety cooperation signal through one of the two signal transmission paths 35 (that is, changes the signal to H level), and then stops outputting the safety cooperation signal through the other signal transmission path 35 (that is, changes the signal to H level). Specifically, each of the first safety module 14A and the second safety module 14B stops outputting the safety cooperation signal through one signal transmission path 35, among the duplicate signal transmission paths 35, through which no more safety cooperation signal are input. The third safety module 14C stops outputting the safety cooperation signal not through the above-described signal transmission path 35 through which no more safety cooperation signals are input but through the signal transmission path 35 through which safety cooperation signals have been output just recently.

Thus, when each safety module 14 returns to normal operation, the safety module 14 stops outputting the safety cooperation signals in order; that is, the safety module 14 stops outputting the safety cooperation signal through one signal transmission path 35 and then stops outputting the safety cooperation signal through the other signal transmission path 35. This makes the signal transmission paths 35 usable in such a manner that returning instructions are transmitted to all the safety modules 14A, 14B, and 14C through the first signal transmission path 35, and signals indicating that the safety modules 14A, 14B, and 14C are ready for returning preparation are transmitted through the second signal transmission path 35. Specifically, the motors 2, which drive different components of the same driven machine 4, may differ from each other in the period of time for the returning preparation. In light of this, the motors 2 are made to start the returning preparation approximately simultaneously in the first round of signal transmission path 35, and completion of the returning preparation in all the motors 2 is confirmed in the second round of signal transmission path 35. In this manner, the entire system returns to normal operation safely. Possible processing that can be done in each of the safety modules 14A, 14B, and 14C to realize this configuration is to: stop outputting the safety cooperation signal at "Direct" from the safety function corresponding to the first signal transmission path 35; and stop outputting the safety cooperation signal from the safety function corresponding to the second signal transmission path 35 upon completion of the returning preparation for the component of the driven machine 4 corresponding to the safety module 14 (this processing is not illustrated).

Advantageous Effects of this Embodiment

As has been described hereinbefore, in the motor control system 1 according to this embodiment, each of the motor control apparatuses 13 includes a safety request input receiving device (for example, the input port 3-A), a safety cooperation input receiving device (for example, the input port 3-C), and a safety cooperation output device (for example, the output port 3-A). Through the safety request input receiving device, a safety request signal is input from outside the motor control apparatus 13. Through the safety cooperation input receiving device, a safety cooperation signal is input from outside the motor control apparatus 13. The safety cooperation signal is for performing control in cooperation with other motor control apparatuses 13. Through the safety cooperation output device, the motor control apparatus 13 outputs the safety cooperation signal to outside the motor control apparatus 13. The motor control system 1 includes the safety modules 14 (the safety control processors 34). Upon input of at least one signal among the safety request signal and the safety cooperation signal from outside each safety module 14, the safety module 14 monitors a relationship between a predetermined motion monitor pattern and a driving state quantity of the motor 2, and outputs the safety cooperation signal to outside the safety module 14.

Thus, the safety request signal and the safety cooperation signal are clearly distinguished from each other. The safety request signal is defined as a signal that is input from an external apparatus or device such as the safety controller 12 and that demands that at least the safety monitor control be performed. The safety cooperation signal is defined as a signal that is input and output to and from the outside and that demands that the motor control apparatus 13 cooperate with the other motor control apparatuses 13 (that is, with other apparatuses or devices) to start at least the safety monitor control. In order to deal with the safety request signal and the safety cooperation signal thus defined, the safety control processor 34 (which causes safety monitor control to be performed in the corresponding motor control apparatus 13) is provided with an input device (for example, the input port 3-A) dedicated to the safety request signal and with input device (for example, the input port 3-C) and an output device (for example, the output port 3-A) dedicated to the safety cooperation signal. This configuration simplifies the wiring configuration in the motor control system 1 through which the demand for the safety monitor control is sent between the motor control apparatuses 13. This results in a lower-cost configuration.

Also in this embodiment, the motor control system 1 includes a plurality of motor control apparatuses 13, which are connected to each other through the signal transmission paths 35. The signal transmission paths 35 connects the safety cooperation output device (the output port 3-A, 2-A, or 1-A) of one particular motor control apparatus 13 to the safety cooperation input receiving device (the input port 3-C, 2-C, or 1-C) of another motor control apparatus 13 so that the safety cooperation signal is transmitted to all the plurality of motor control apparatuses 13 through the signal transmission paths 35. This ensures that the safety cooperation signal is transmitted in a one-directional, end-to-end manner between the safety control processors 34 of the plurality of motor control apparatuses 13 through the signal transmission paths 35. This, in turn, ensures that the safety control processor 34 of the first motor control apparatus 13 to output the safety cooperation signal cooperates with the safety control processors 34 of all the downstream motor control apparatuses 13 side to start performing safety monitor control.

Also in this embodiment, each of the signal transmission paths 35 is a ring-shaped path. This ensures that upon output of a safety cooperation signal from any one of the plurality of motor control apparatuses 13, the safety cooperation signal is circulated throughout the safety control processors 34 of the motor control apparatuses 13 in a one-directional, end-to-end manner through the signal transmission path 35, enabling the motor control apparatuses 13 to start safety monitor control simultaneously.

Also in this embodiment, a plurality of signal transmission paths 35 are provided (in other words, the signal transmission paths 35 have a redundant (multiplicate) structure). This ensures such a fail-safe configuration that even if one of the signal transmission paths 35 is disconnected on a work site, a regular transmission function for the safety cooperation signal is secured.

Also in this embodiment, the safety control processor 34 stops monitoring the relationship between the motion monitor pattern and the driving state quantity, and stops outputting the safety cooperation signal when no more safety request signals and safety cooperation signals are input from the outside. When the safety control processor 34 starts outputting safety cooperation signals, the safety control processor 34 outputs the safety cooperation signals approximately simultaneously through all the duplicate signal transmission paths 35. When the safety control processor 34 stops outputting the safety cooperation signals, the safety control processor 34 stops outputting the safety cooperation signal through the signal transmission path 35 (among all the duplicate signal transmission paths 35) that corresponds to the safety cooperation input receiving device through which no more safety cooperation signals are input; or the safety control processor 34 stops outputting the safety cooperation signal through the signal transmission path 35 that has been used by the safety control processor 34 just recently to output safety cooperation signals. This ensures two-or-more stage returning processing such that in the first round of signal transmission path 35, the motor control apparatuses 13 start respective returning preparations approximately simultaneously; and in the second and later rounds of signal transmission path 35, a confirmation is made as to whether all the returning preparations have been completed, and after the confirmation, the entire system starts returning to normal operation safely.

Also in this embodiment, the safety cooperation signal is output in the form of a negative logic (L level, normally-on) signal. This ensures that even if any portion of the signal transmission paths 35 is disconnected and the signal level decreases to low level, the safety cooperation signal is transmitted as a negative-logic safety cooperation signal, causing the safety modules 14 of the motor control apparatuses 13 to start performing safety monitor control.

Also in this embodiment, a test signal (test pulse) is output through the safety cooperation output device (the output ports 3-A, 2-A, and 1-A) before the safety cooperation signal is output through the safety cooperation output device. This enables a determination to be made as to whether an input safety cooperation signal is a signal that has been output normally or a signal resulting from wiring disconnection.

Also in this embodiment, the safety cooperation input receiving device (the input ports 3-C, 2-C, and 1-C), the safety cooperation output device (the output ports 3-A, 2-A, and 1-A), and the signal transmission paths 35 are not implemented by a communication network compliant with a predetermined protocol. Instead, the safety cooperation input receiving device, the safety cooperation output device, and the signal transmission paths 35 are a transmission device, a receiving device, and digital signal lines, respectively, through which simple digital signals can be transmitted and received. In this embodiment, the wiring configuration between the safety modules 14A, 14B, and 14C is a "ring-shaped transmission wiring configuration" or a "daisy-chain" wiring configuration. Thus, there is no need for such wiring configuration as a "star-shaped" wiring configuration, a "tree-shaped" wiring configuration, and a "bus" wiring configuration, at least between the plurality of motor control apparatuses 13. With these wiring configurations, safety cooperation signals are distributed from one node to a plurality of nodes. Since implementing these distributed-type wiring configurations involves high levels of technical complexity, the production cost would increase if a wiring configuration were implemented by a communication network with any of the distributed-type wiring configurations. The wiring configuration between the safety modules 14A, 14B, and 14C in this embodiment need not be any of the distributed-type wiring configurations, and can be implemented at low function and low cost to transmit safety cooperation signals. It is to be noted that the safety cooperation input receiving device (the input ports 3-C, 2-C, and 1-C) and the safety cooperation output device (the output ports 3-A, 2-A, and 1-A) are dedicated to inputting and outputting safety cooperation signals, as distinguished from other input ports and output ports. This shortens the processing time and reduces the load on the system.

Also in this embodiment, each of the motor control apparatuses 13 includes the HWBB 32. Upon input of a power supply breaking signal from the safety control processor 34, the HWBB 32 breaks the supply of power to the motor 2. The safety control processor 34 outputs an HWBB activation signal to the HWBB 32 when a predetermined motion monitor pattern and the driving state quantity of the corresponding motor 2 is in a predetermined relationship (for example, when the driving state quantity has exceeded the motion monitor pattern). This ensures that when, for example, the safety motion control is not functioning properly, turning the relationship between the driving state quantity and the motion monitor pattern into a predetermined relationship, the motor 2 automatically performs a safest and most reliable deceleration stopping motion (specifically, STO).

Also in this embodiment, the motion monitor pattern is a time-series changing pattern that starts upon input of the safety request signal or the safety cooperation signal that has been input earlier. This makes the motion monitor pattern changeable with time based on the input timing at which the safety request signal or the safety cooperation signal that has been input earlier, resulting in safety monitor control suitable for the component of the driven machine 4 controlled by the motor 2 that corresponds to the motor control apparatus 13 of interest.

Modifications

Modifications of the above-described embodiment will be described below.

Safety Control Performed Based on Analogue Signal, Different from Safety Request Signal In the above-described embodiment, the safety modules 14 start performing safety control upon input of a safety request signal, which is a network signal (digital signal), from the safety controller 12. This configuration, however, is not intended in a limiting sense. For example, some motors are equipped with analogue sensors (not illustrated) to directly detect temperature, output torque, or other parameters associated with motors. This configuration is illustrated in FIG. 10, which corresponds to FIG. 5. Referring to FIG. 10, when a sensor of the above kind has detected an analogue signal, the analogue signal is directly input as an input signal (equivalent to one driving state quantity) into a signal input device 14Ca of the safety module 14C. In the safety module 14C, the safety module 14C performs processing of detecting an abnormality in the motor 2C based on the input signal. Based on the result of the processing, the safety module 14C starts performing safety control and starts outputting a safety cooperation signal.

In the modification illustrated in FIG. 10, the setting items of the safety functions may be set as follows (not illustrated). On "Select safety signal input source", input ports dedicated to analogue signals ("Feed Back Input 1", "Feed Back Input 2", "Feed Back Input 3", "Feed Back Input 4", and "Feed Back Input 5") are selected as input sources of input signals. On "Select motion monitor pattern", motion monitor patterns for detecting abnormalities in input analogue signals are selected. On "Select output destination of monitor result signal", the input port 3-A, which corresponds to the safety controller 12, is selected as the output destination (that is, recursive input of the safety request signal). In this respect, the safety module 14C may inversely output the safety request signal to the safety controller 12.

With this configuration, the analogue sensor mounted on the motor 2 directly inputs an analogue detection signal into the safety module 14, which is in many cases located comparatively near the motor 2, enabling the safety module 14 itself to make a determination as to an abnormality in the motor 2 and to start performing safety control. This shortens the length of wires for analogue signals, which are comparatively vulnerable to noise, and eliminates the need for the safety controller 12, which is comparatively expensive, resulting in a reduction in the cost associated with the motor control system 1 as a whole.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "simultaneously", "identical", "same", "equivalent", and "different" are used in the context of dimensions, magnitudes, sizes, or positions, these terms may not necessarily mean "simultaneously", "identical", "same", "equivalent", and "different", respectively, in a strict sense. Specifically, the terms "simultaneously", "identical", "same", "equivalent", and "different" mean "approximately simultaneously", "approximately identical", "approximately same", "approximately equivalent", and "approximately different", respectively, with design-related and production-related tolerance and error taken into consideration.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A motor control system, comprising:
at least one motor; and
a plurality of motor control apparatuses at least one of the motor control apparatuses including first processing circuitry configured to, based on a driving state quantity of a motor of the at least one motor from a sensor, control driving power supplied to the motor, safety request input receiving circuitry through which a safety request signal is input from outside the motor control apparatus, safety cooperation input receiving circuitry through which a safety cooperation signal is input from outside the motor control apparatus, safety cooperation output circuitry through which the motor control apparatus is configured to output the safety cooperation signal to outside the motor control apparatus, and second processing circuitry configured to, upon input of at least one signal among the safety request signal and the safety cooperation signal, monitor a relationship between a predetermined motion monitor pattern and the driving state quantity and output the safety cooperation signal, wherein
the safety cooperation input receiving circuitry receives the safety cooperation signal from another one of the plurality of motor control apparatuses.

2. The motor control system according to claim 1, wherein the plurality of motor control apparatuses are connected to each other through a signal transmission path, the signal transmission path connecting safety cooperation output circuitry of a particular motor control apparatus among the plurality of motor control apparatuses to safety cooperation input receiving circuitry of another motor control apparatus among the plurality of motor control apparatuses so that the safety cooperation signal is transmitted to the plurality of motor control apparatuses through the signal transmission path.

3. The motor control system according to claim 2, wherein the signal transmission path comprises a closed ring-shaped path.

4. The motor control system according to claim 3, wherein the second processing circuitry includes signal input circuitry through which the driving state quantity is input, and
upon input of a signal into the signal input circuitry, the second processing circuitry is further configured to monitor the relationship between the predetermined motion monitor pattern and the driving state quantity, and output the safety cooperation signal to outside the motor control apparatus.

5. The motor control system according to claim 3, wherein
the safety cooperation input receiving circuitry includes receiving circuitry configured to receive a digital signal,
the safety cooperation output circuitry includes transmission circuitry configured to transmit the digital signal, and
the signal transmission path includes a digital signal line through which the digital signal is transmittable and receivable.

6. The motor control system according to claim 3, wherein
the motor control apparatus further comprises power supply breaking circuitry configured to break supply of the driving power to the motor upon input of a power supply breaking signal from the second processing circuitry, and
when the relationship between the predetermined motion monitor pattern and the driving state quantity corresponds to a predetermined relationship, the second processing circuitry is configured to output the power supply breaking signal to the power supply breaking circuitry.

7. The motor control system according to claim 2, wherein
the signal transmission path has a multiplicate structure including a plurality of signal transmission paths.

8. The motor control system according to claim 7, wherein
the second processing circuitry includes signal input circuitry through which the driving state quantity is input, and
upon input of a signal into the signal input circuitry, the second processing circuitry is configured to monitor the relationship between the predetermined motion monitor pattern and the driving state quantity, and output the safety cooperation signal to outside the motor control apparatus.

9. The motor control system according to claim 7, wherein
the safety cooperation input receiving circuitry includes receiving circuitry configured to receive a digital signal,
the safety cooperation output circuitry includes transmission circuitry configured to transmit the digital signal, and
the signal transmission path includes a digital signal line through which the digital signal is transmittable and receivable.

10. The motor control system according to claim 7, wherein
the motor control apparatus further comprises power supply breaking circuitry configured to break supply of the driving power to the motor upon input of a power supply breaking signal from the second processing circuitry, and
when the relationship between the predetermined motion monitor pattern and the driving state quantity corresponds to a predetermined relationship, the second processing circuitry is configured to output the power supply breaking signal to the power supply breaking circuitry.

11. The motor control system according to claim 2, wherein
the safety cooperation input receiving circuitry includes a receiving circuitry configured to receive a digital signal,
the safety cooperation output circuitry includes a transmission circuitry configured to transmit the digital signal, and
the signal transmission path includes a digital signal line through which the digital signal is transmittable and receivable.

12. The motor control system according to claim 2, wherein
the second processing circuitry includes signal input circuitry through which the driving state quantity is input, and
upon input of a signal into the signal input circuitry, the second processing circuitry is further configured to monitor the relationship between the predetermined motion monitor pattern and the driving state quantity, and output the safety cooperation signal to outside the motor control apparatus.

13. The motor control system according to claim 2, wherein
the motor control apparatus further comprises power supply breaking circuitry configured to break supply of the driving power to the motor upon input of a power supply breaking signal from the second processing circuitry, and
when the relationship between the predetermined motion monitor pattern and the driving state quantity corresponds to a predetermined relationship, the second processing circuitry is configured to output the power supply breaking signal to the power supply breaking circuitry.

14. The motor control system according to claim 1, wherein
the motor control apparatus is further configured to output a test signal through the safety cooperation output circuitry before the safety cooperation signal is output through the safety cooperation output circuitry.

15. The motor control system according to claim 14, wherein
the second processing circuitry includes signal input circuitry through which the driving state quantity is input, and upon input of a signal into the signal input circuitry, the second processing circuitry is configured to monitor the relationship between the predetermined motion monitor pattern and the driving state quantity, and output the safety cooperation signal to outside the motor control apparatus.

16. The motor control system according to claim 14, wherein
the motor control apparatus further comprises power supply breaking circuitry configured to break supply of the driving power to the motor upon input of a power supply breaking signal from the second processing circuitry, and
when the relationship between the predetermined motion monitor pattern and the driving state quantity corresponds to a predetermined relationship, the second processing circuitry is configured to output the power supply breaking signal to the power supply breaking circuitry.

17. The motor control system according to claim 1, wherein
the second processing circuitry includes signal input circuitry through which the driving state quantity is input, and
upon input of a signal into the signal input circuitry, the second processing circuitry is further configured to monitor the relationship between the predetermined motion monitor pattern and the driving state quantity, and output the safety cooperation signal to outside the motor control apparatus.

18. The motor control system according to claim 1, wherein
the motor control apparatus further comprises power supply breaking circuitry configured to break supply of the driving power to the motor upon input of a power supply breaking signal from the second processing circuitry, and
when the relationship between the predetermined motion monitor pattern and the driving state quantity corresponds to a predetermined relationship, the second processing circuitry is further configured to output the power supply breaking signal to the power supply breaking circuitry.

19. The motor control system according to claim 18, wherein
the predetermined motion monitor pattern includes a time-series changing pattern that starts upon input of the safety request signal or the safety cooperation signal.

20. A motor control apparatus that controls driving power supplied to a motor, comprising:
safety request input receiving circuitry through which a safety request signal is input from outside the motor control apparatus;
safety cooperation input receiving circuitry through which a safety cooperation signal is input from outside the motor control apparatus;
safety cooperation output circuitry through which the motor control apparatus is configured to output the safety cooperation signal to outside the motor control apparatus; and
safety control processing circuitry configured to, upon input of at least one signal among the safety request signal and the safety cooperation signal, monitor a relationship between a predetermined motion monitor pattern and a driving state quantity of the motor, and output the safety cooperation signal, wherein
the safety cooperation input receiving circuitry receives the safety cooperation signal from another one of a plurality of motor control apparatuses.

* * * * *